(12) United States Patent
Morita et al.

(10) Patent No.: US 6,934,042 B1
(45) Date of Patent: Aug. 23, 2005

(54) IMAGE PROCESSING APPARATUS CONNECTABLE TO NETWORK

(75) Inventors: Kenichi Morita, Toyohashi (JP); Alan Darby, Chatswood (AU); Tatsuji Nozawa, Toyokawa (JP); Hiroshi Ootsuka, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/271,503

(22) Filed: Mar. 18, 1999

(30) Foreign Application Priority Data

Mar. 19, 1998 (JP) .......................... 10-070225

(51) Int. Cl.⁷ .............................................. G06F 15/00
(52) U.S. Cl. ...................... 358/1.15; 358/442; 358/448; 358/468
(58) Field of Search ................. 358/1.15, 442, 358/448, 468; 709/107, 201, 205, 218, 238

(56) References Cited

U.S. PATENT DOCUMENTS 4,658,299 A * 4/1987 Tanaka et al. .............. 358/401
5,138,702 A * 8/1992 Tada .......................... 345/501
5,845,057 A * 12/1998 Takeda et al. ............. 358/1.15

FOREIGN PATENT DOCUMENTS

| JP | 5-274397 | 10/1993 |
| JP | 5-300338 | 11/1993 |
| JP | 8-098038 | 4/1996 |

* cited by examiner

*Primary Examiner*—Twyler Lamb
(74) *Attorney, Agent, or Firm*—Morrison & Foerster LLP

(57) ABSTRACT

An image processing apparatus can share a function of other apparatuses when it is connected to a network. The image processing apparatus comprises function blocks such as an image reader, an image processor and a printer, interface means connected to the network, and an image bus switcher for switching buses for connecting these elements. The image bus switcher is used to transmit data, whereby an application program of the other apparatus connected to the network can be used, for example. After the image data is processed by using the application program of the other apparatus, the processed data can be also transmitted and printed. When the other apparatus is used, a power is supplied to the necessary function blocks alone, thereby starting these blocks.

19 Claims, 17 Drawing Sheets

IMAGE PROCESSING APPARATUS CONNECTABLE TO NETWORK

This application is based on an application 1070225/1998 filed in Japan, the content of which is incorporated hereinto by reference.

BACKGROUND OF THE INVENTION

1. Field of the Invention

The present invention relates to data transmission in a system including apparatuses connected to a network.

2. Description of Prior Art

A various image processing systems have been proposed and realized which have a copying machine and the like connected to a network. For example, a copying machine disclosed in Japanese Patent laid open Publication 5-274397/1993 has a function which can be operated not by the copying machine, but by a server connected thereto in the network. After operation is completed, the copying machine receives the processed data from the server and prints the data. An apparatus disclosed in Japanese Patent laid open publication 5-300338/1993 has various functions of image read function, facsimile function and print function. The apparatus includes buses and bus switches for data transmission for achieving the functions. Further, Japanese Patent laid open publication 8-98038/1996 shows a plurality of digital copying machines connected in a network. A remote data output is described for printing from a copying machine to another copying machine. However, the first and third publications do not describe switching in bus connection for changing destination of image data in a copying machine. The second publication only describes an apparatus having composite functions, and it does not describe connection to a network.

SUMMARY OF THE INVENTION

An object of the present invention is to provide an image processing apparatus which can share a function of another apparatus connected to the image processing apparatus through a network.

In one aspect of the invention, an image processor comprises a plurality of function blocks connectable to each other and dealing image data, and an interface connected to a network. Further, a bus changer changes bus connection among the function blocks and the interface.

In another aspect of the invention, an image processor comprises further a controller which discriminates data received from the network and controls data transmission to one of the function blocks to be operated.

In a further aspect of the invention, an image processor comprises a plurality of function blocks connectable to each other and dealing image data, an interface connected to a network, and a bus changer which changes bus connection among the plurality of function blocks and the interface. Further, a memory has a function management table to manage executable functions, and a controller requests an external apparatus connected through the interface and the network to operate a function when the function is not managed in the function management table in the memory.

In a still further aspect of the invention, when image processing in an image processor including a plurality of function blocks is controlled, a request is received to perform a function, and it is decided whether the function is executable in the image processor. Then, bus connection is changed between a necessary function block and the interface to operate an external apparatus connected through an interface connectable to the network when the function is decided not executable in the image processor.

An advantage of the present invention is that a function in an apparatus can be shared more among the apparatuses connected to the network.

Another advantage of the present invention is that an application program in an apparatus can be shared with another apparatus.

A further advantage of the invention, a function even of the apparatus having a sleep function and connectable to the network can be shared among the apparatuses by controlling the power supply.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
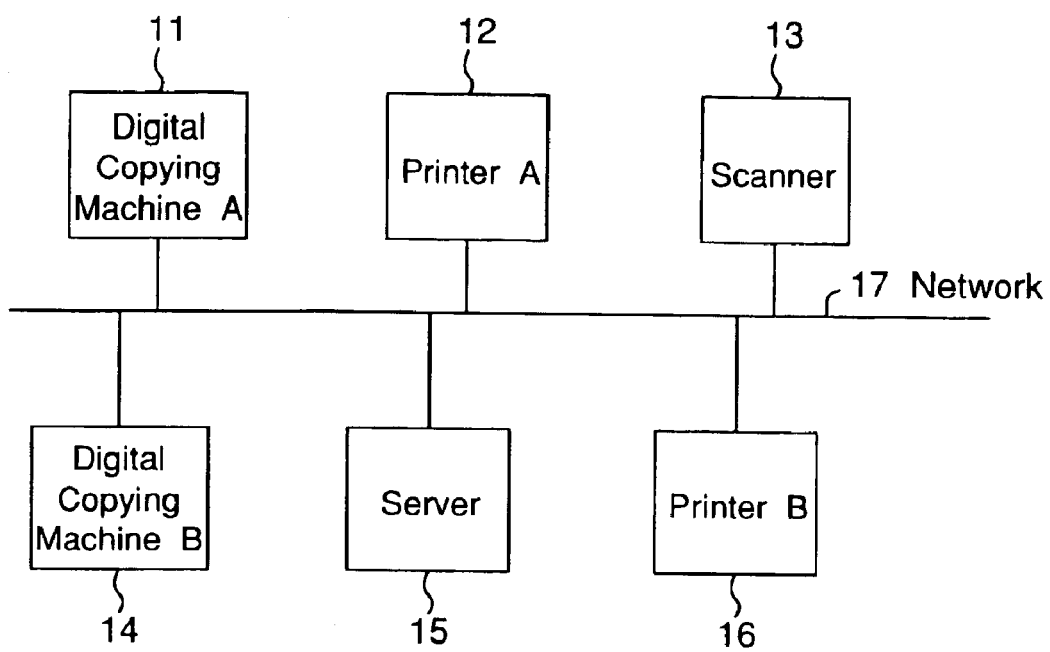
FIG. 1 is a diagram of a system configuration of an image input/output system connected to a network.

Referring now to the drawings, wherein like reference characters designate like or corresponding parts throughout the views, embodiments of the present invention will be described below.

(1) System Configuration

FIG. 1 shows a system configuration of an image input/output system connected to a network according to an embodiment of the present invention. This system comprises one or more (two in this example) digital copying machines 11 and 14, one or more (two in this example) printers 12 and 16, a scanner 13, and a server 15 for controlling the network terminals through a network 17. Each digital copying machine 11 and 14 includes an automatic document feeder, an image reader, an image forming section, a data output section, a display device, a network interface and the like. The type and the number of the apparatuses connected to the network are not fixed. As described below, data can be transmitted between the apparatuses connected to the network. Therefore, a function can be shared between them. For example, an application program in a certain apparatus can be used by other apparatuses.

(2) Digital Copying Machine

Figure 2:
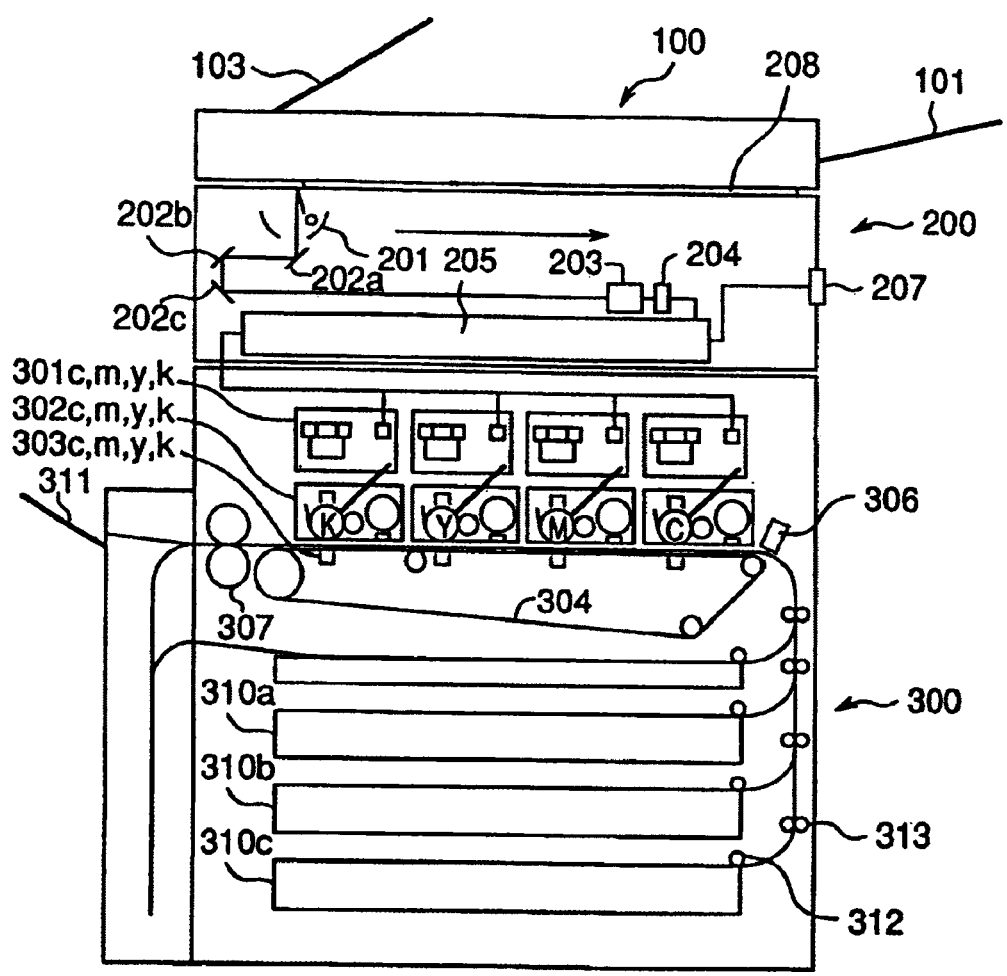
FIG. 2 is a schematic sectional view of a structure of a digital copying machine.

FIG. 2 shows a structure of the digital copying machines 11 and 14 connected to the network. The digital copying machine comprises a mechanical system including an automatic document feeder 100, an image reader 200 and an printer 300, and electrical hardware including a controller, a memory, an image processor, an image switcher, a display device and a network interface.

First, the mechanical system will be described. The automatic document feeder 100 feeds a document set on a tray 101 to an image read position of the image reader 200. After the completion of image reading, the document is discharged onto another tray 103. The document is fed in accordance with a command from an operation panel, and it is discharged in accordance with a read end signal from the image reader 200.

When documents are set, a control signal for the documents is consecutively generated to efficiently feed, read and discharge the documents.

Next, the image reader 200 will be described. A document on a platen glass plate 208 is illuminated by an exposure lamp 201. A light reflected from the document is then guided to a lens 203 by three mirrors 202 so that an image is formed on a CCD sensor 204. The exposure lamp 201 and the first mirror 202a scan the document at a velocity V in accordance with a magnification power in a direction indicated by an arrow by a scanner motor (not shown), to scan the document on the platen glass 208. The second and third mirrors 202b and 202c are moved in the same direction at a velocity V/2 with the scanning of the exposure lamp 201 and the first mirror 202a. The light reflected from the document is incident on the CCD sensor 204 and converted to an electric signal. The electric signal is processed by an image processor circuit 205. Then, the resultant data is sent to a network interface 207 and the printer 300 or stored in a memory (not shown).

In the printer 300, the image data transmitted from the image reader 200, the network interface 207 or the memory is converted to print data of cyan (C), magenta (M), yellow (Y) and black (K). The data are sent to exposure heads 301c, 301m, 301y and 301k, wherein a laser diode emits a light beam in accordance with the electric signal of the print data. The emitted light beam is scanned by a polygon mirror in one dimension. Photoconductors in four imaging units 302c, 302m, 302y and 302k are exposed to the light beam. In each of the imaging units 302c, 302m, 302y and 302k, components required for electrophotography process are arranged around the photoconductor. The photoconductors are rotated clockwise in FIG. 1 for performing the electrophotographic processes continuously. A latent image on the photoconductor is developed by color developing units.

A sheet of paper is supplied to a transfer position in the following sequence. Papers of various sizes are set in paper cassettes 310a, 310b and 310c. A paper of a desired size is supplied along a feeding path by a paper feeding roller 312 mounted to each of the paper cassettes. The paper is fed onto a belt 304 by a pair of rollers 313, and it is adjusted by a timing sensor 306 so that the paper may be timely supplied.

Toner images on the photoconductors are transferred to the paper on the belt 304 by transfer chargers 303c, 303m, 303y and 303k located opposite to the photoconductor on the belt 304. The toner images transferred onto the paper are heated, melted and fixed by a pair of fixing rollers 307. The paper is then discharged to a tray 311.

Figure 3:
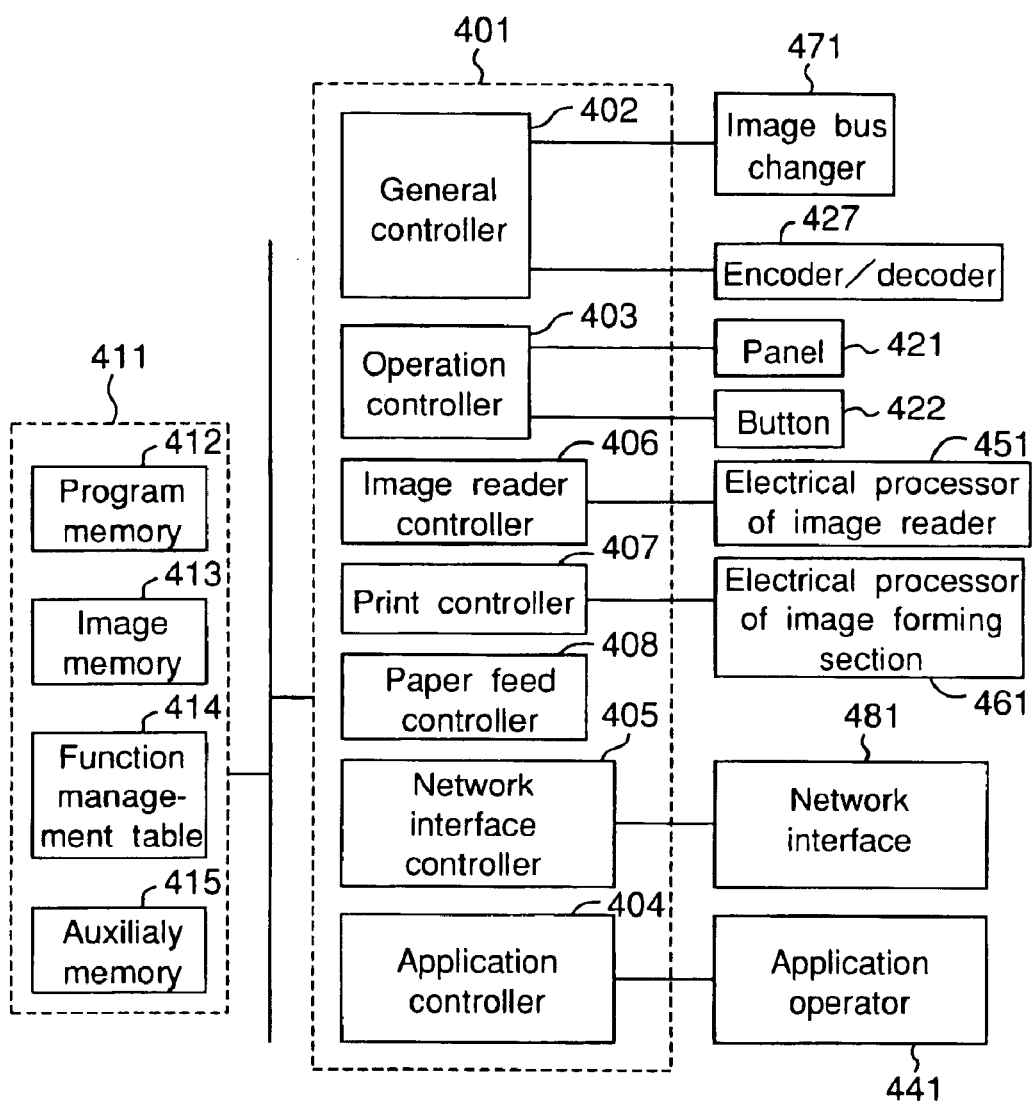
FIG. 3 is a block diagram of an electric hardware configuration of the digital copying machine.

FIG. 3 shows a structure of the electrical hardware of the digital copying machine 11, 14. The electrical hardware comprises a controller 401, a memory 411, an image processor, an image switcher 471, a network interface 481, an application operator 441, an operation panel and the like.

First, the controller 401 will be described. The controller 401 includes many controllers. A general controller 402 controls the whole copying machine. The general controller 402 communicates with the memory 411. The general controller 402 controls the image switcher 471. An operation controller 403 controls a display panel 421 and buttons 422 in the operation panel. An image reading controller 406 controls an electrical processor 451 of the image reader 200. A image forming controller 407 controls an electrical processor 461 for the electrophotographic process in the printer 300. A paper feeding controller 408 controls the belt 304, the rollers 309, 312 and 313 for the paper feeding, and the like. A network interface controller 405 is connected through a network interface 481 to an external apparatus, whereby it sends and receives image data to and from the external apparatus and the server, and it communicates with them about the capability and status of the apparatus. An application controller 404 controls the execution of an application program in the application operator 441.

Next, the memory 411 will be described. The memory 411 comprises a program memory 412 for storing a program for controlling the digital copying machine, an image memory 413 for storing image data, a function management table 414 for storing functions of the copying machines, and an auxiliary memory 415 for storing an application program.

The application program is a program for processing captured image data for a particular purpose. The application program for another processing could be also added within a capacity of the auxiliary memory 415. For example, it is a program for recognizing handwritten characters and converting the characters to a predetermined code, a program for angular correction of inclined characters, or the like. In the image input/output system connected to the network, if one apparatus has a particular application program, any other apparatus can process the image data by using the application program.

The application program is stored in the auxiliary memory 415 in the memory 411. The application program is started in the following cases: the panel operation allows the general controller 402 to recognize the use of a particular application program, and the apparatus knows by the function management table 414 that the apparatus itself has the application program. It is also started in the following cases: an external apparatus requests the general controller 402 through the network interface controller 405 to permit to use the application program, and the network interface controller 405 permits to use the application program. An application program can be added when the memory capacity has a room for an additional application program.

Next, the function management table 414 will be described. The image input/output system connected to the network has a merit that a function of an apparatus can be used even by an instruction from another apparatus. In order to use the merit, it is required to grasp possible functions in the system. Thus, each apparatus includes the function management table 414 in which the possible functions of the apparatus are registered.

The function management table 414 exists in the memory 411. When the panel operation causes the general controller 402 to instruct a certain processing, the general controller 402 checks the contents in the function management table 414 so as to decide whether or not the processing can be performed. When the external apparatus requests the general controller 402 through the network interface controller 405 to permit to use a particular processing, the contents in the function management table 414 are referred to decide whether or not the processing can be used. Then, the external apparatus is informed of the decision through the network interface controller 405.

Figure 4:
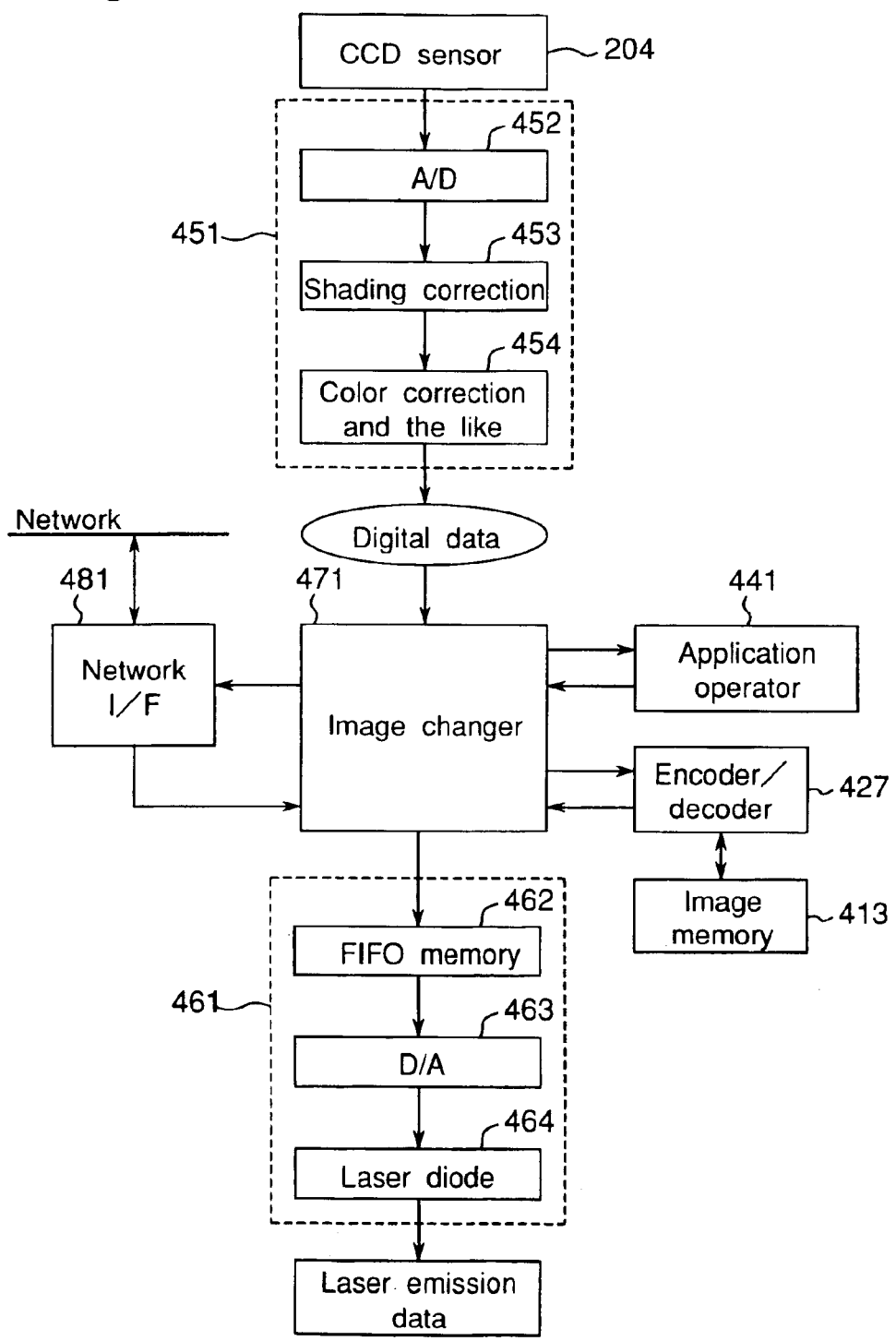
FIG. 4 is a diagram of a structure of an image processor.

Next, electrical processing of image data in the copying machine will be described. FIG. 4 schematically shows a section for electrically processing the image data. As shown in FIG. 4, the section has various function blocks for processing the image data, that is, the image reader 200, the printer 300, the application controller 404, the image memory 413, the network interface 481, etc., and they are connected to the image switcher 471. As described below, the image switcher 471 switches image buses therein to control a data transmission route between the function blocks.

First, the electrical processor 451 in the image reader 200 will be described. The light reflected from the document, which is incident on the CCD sensor 204, is converted to a voltage level. The voltage level is converted to a digital signal by an A/D converter 452, and the digital signal is subjected to shading correction by a shading corrector 453. Then, the obtained digital signal is subjected to image processing by a color corrector 454 or the like. The processed digital data is held in the image memory 413. If required, the digital data is edited or compressed by the application program and then kept in the image memory 413. To print or transmit the digital data onto the network, the digital data is sent to the image switcher 471. In accordance with an instruction from the general controller 402, the image switcher 471 switches destination of image buses between the electrical processor 451 in the image reader, the electrical processor 461 in the image forming section, the image memory 413 and the network interface 481 (refer to FIG. 5).

Next, the electrical processor 461 in the image forming section will be described. When the image data is sent to the electrical processor 461 through the image switcher 471 in accordance with an instruction from the general controller 402, the image data is adjusted through a FIFO memory 462 at a transmission rate of print data. Subsequently, the image data is converted to analog voltage by a digital-to-analog converter 463. Then, the voltage signal of the image data is sent to the exposure head. The image data is converted to the electrical voltage according to which the light is emitted by a laser diode 464. The laser diode emits a light beam so that the photoconductor is exposed to the light. Thereafter, an image is finally formed on a paper according to the processes described above.

Figure 5:
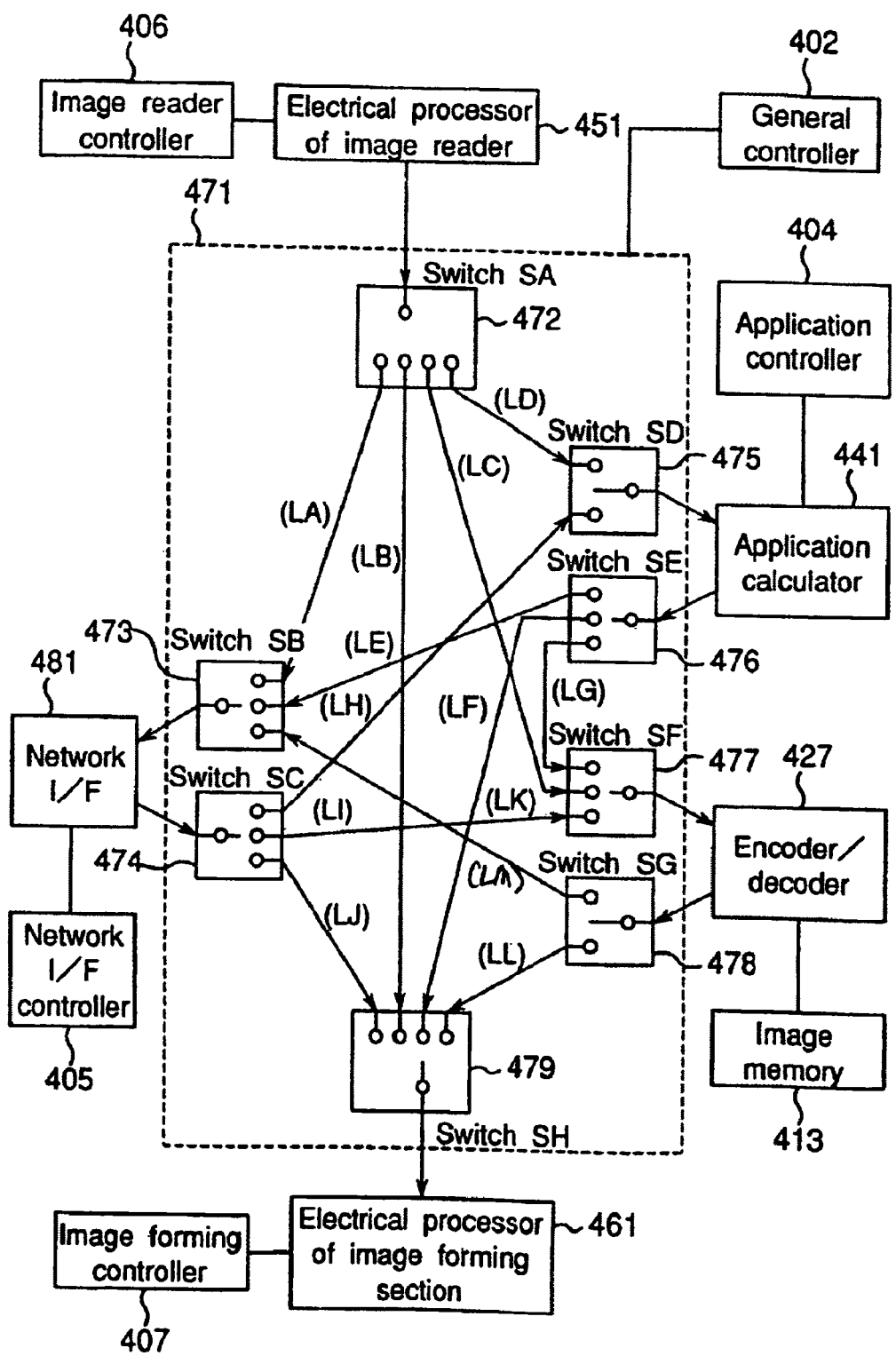
FIG. 5 is a circuit diagram of an image switcher.

Next, a sequence of the image switching in the image switcher 471 will be described. As shown in FIG. 5, the image switcher 471 is connected to a plurality of function blocks for processing the image data (the electrical processor 451 controlled by the image read controller 406, the electrical processor controlled by the image forming controller 407, the network interface 481 controlled by the network interface controller 405 and the memory 411 through an encoder/decoder 427). The image switcher 471 includes eight analog switches 472 to 479. These switches are controlled by the general controller 402 to change the image bus or command bus in a direction in which the image is to be transmitted. The switches are connected to the following elements.

An input of the switch SA (472) is connected to the electrical processor 451 in the image reader. Outputs LA, LB, LC and LD of the switch SA (472) are connected to the electrical processor 461 in the image forming section, the network interface 481, the application operator 441 and the encoder/decoder 427.

Inputs LA, LE, LM of the switch SB (473) are connected to the electrical processor 451 in image the reader, the application operator 441 and the encoder/decoder 427. An output of the switch SB (473) is connected to the network interface 481.

An input of the switch SC (474) is connected to the network interface 481. Outputs of the switch SC (474) are connected to the electrical processor 461 in the image forming section, the application operator 441 and the encoder/decoder 427.

Inputs of the switch SD (475) are connected to the electrical processor 451 in the image reader and the network interface 481. The output of the switch SD (475) is connected to the application operating section 441.

Input of the switch SE (476) is connected to the application operator 441. Outputs of the switch SE (476) are connected to the electrical processor 461 in the image forming sectiin the network interface 481 and the encoder/decoder 427.

Inputs of the switch SF (477) are connected to the electrical processor 451 in the image reader, the network interface 481 and the application operating section 441. An output of the switch SF (477) is connected to the encoder/decoder 427.

An input of the switch SG (478) is connected to the encoder/decoder 427. Outputs of the switch SG (478) are connected to the electrical processor 461 in the image forming section and the network interface 481.

Inputs of the switch SH (479) are connected to the electrical processor 451 in the image reader, the network interface 481, the application operating section 441 and the encoder/decoder 427. An output of the switch SH (479) is connected to the electrical processor 461 in the image forming section.

As to the use of an application program in another apparatus connected to the network, there are combinations (a) to (e) of the switches, as described below:

(a) A direction of short circuit for reading and copying the image wherein the apparatus is used as a stand-alone apparatus: switch SA (472)→line LA→switch SH (479);

(b) a direction of short circuit for transmitting the image data obtained by this apparatus to another apparatus in the network: switch SA (472)→line LA→switch SB (473);

(c) a direction of short circuit for processing the image transmitted from another apparatus in the network by the application program of this apparatus: switch SC (474) →line LH→switch SD (475);

(d) a direction for processing the image transmitted from another apparatus in the network by the application program and outputting the processed image data from this apparatus: switch SC (474)→line LH→switch SD (475)→application controller 404→switch SE (476)→line LF→switch SH (479); and (e) a direction of short circuit for outputting, from this apparatus, the image data transmitted from other apparatus in the network: switch SC (474)→line LJ→switch SH (479). The switches, not described in the combinations (a) to (e), are set to be open.

Of the above-mentioned operations (a) to (e), the operations (a) and (c) can be simultaneously performed. The operations (b) and (d) can be simultaneously performed by time-slicing in the network interface 481. Simultaneous operation of (b) and (c) can be performed as far as the application program is not used for the processing (b).

When the image data is held temporarily after the application processing, line LG is short-circuited to send the image data to the compressor 427. On the other hand, when the image data is decoded by the decoder 427 and then the image data is outputted, line LL is short-circuited to output the image data from this apparatus, or line LK is short-circuited to output the image data from another apparatus in the network.

Next, the network interface 481 will be described. The network interface 481 controls the transmission of command/status data and image data between the apparatuses connected to the network. The network interface 481 is controlled by the network interface controller 405, which switches a network line between a command/status bus line and an image bus line in accordance with an instruction from the general controller 402.

Figure 6:
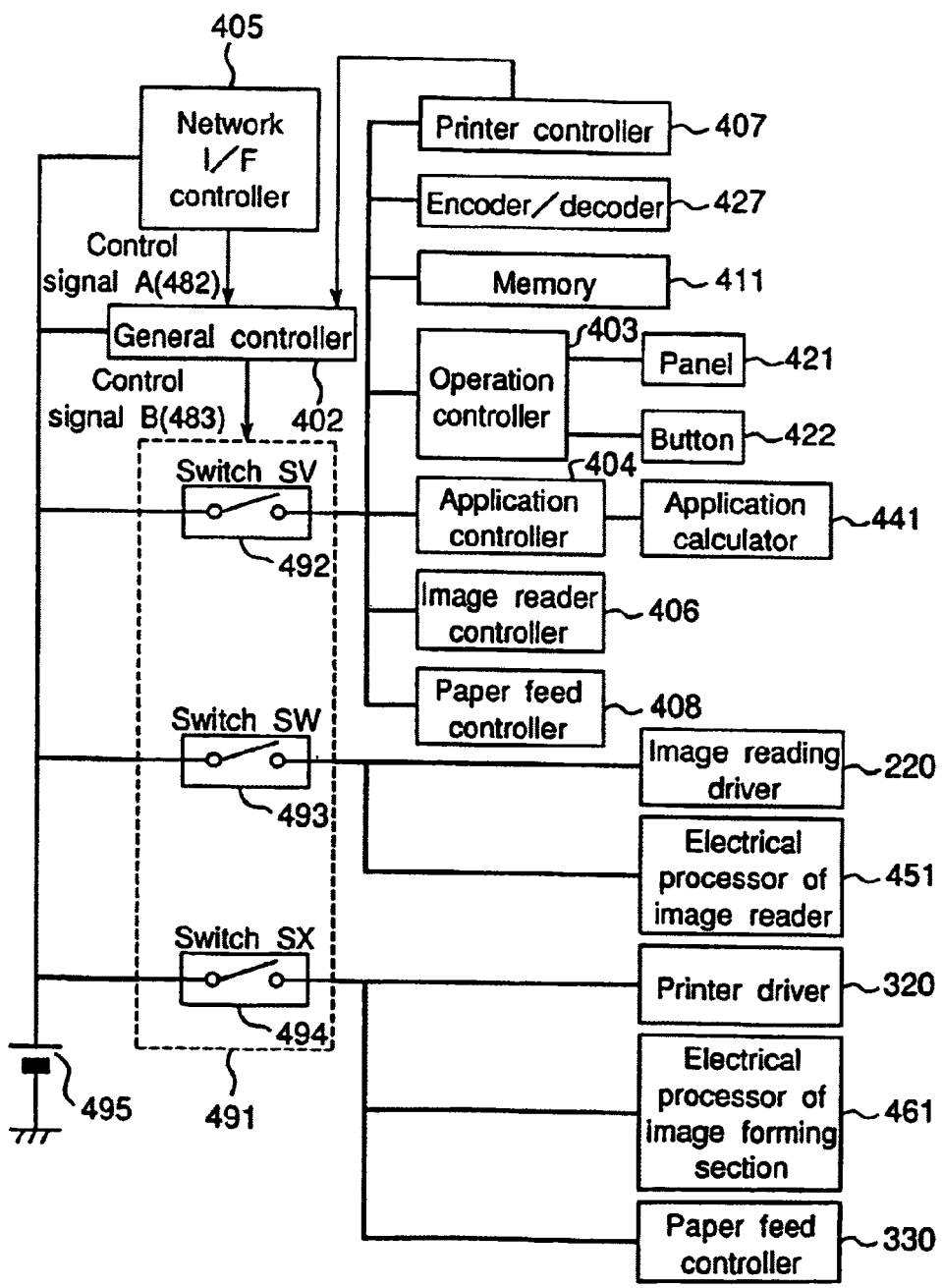
FIG. 6 is a block diagram of a power supply controller.

Next, the whole power supply and partial power supply in the digital copying machine will be described on the power supply. As shown in FIG. 6, the general controller 402 controls a power supply controller 491 and monitors a power supply 495. In the partial supply mode, the power supply 495 is turned on or off for the function blocks as needed (the partial supply of electric power). The power supply controller 491 controls switchs SV (492), SW (493) and SX (494) in accordance with a control signal. When the power supply is only connected to an outlet, the switches remains open and thus the electrical power is supplied only to the general controller 402 and the network interface controller 405. When a normal main switch is turned on, the power is supplied only to the switch SV (492) in the power supply controller 491. Thus, the power can be supplied to the limited block such as a part of the controller 401, the memory 411 or the panel 421. On the other hand, in the whole supply mode, the power is supplied to the whole copying machine.

When the general controller 402 issues an instruction to drive the image reader 200 in accordance with an instruction from the panel 421 and the button 422, the switch SW (493) in the power supply controller 491 is closed. Then, the power is supplied to a driver 220 and the electrical processor 451 in the image reader 200, so that image reading is started.

When the general controller 402 issues an instruction to print the image in accordance with an instruction from the panel 421 and the button 422, the switch SX (494) in the power supply controller 491 is closed. Then, a driver 320 and the electrical processor 461 in the image forming section 300 and a paper feeding driver 330 are started to be driven.

When the image is not read or formed within a fixed time, the general controller 402 issues an instruction to open the switchs SW (493) and SX (494). As a result, the power supply is not connected to the driver 220 in the image reader, the driver 320 in the image forming section, and the like. This status is called "sleep status".

The switchs SW (493) and SX (494) are independently monitored on the time. Thus, the power supplies for the driver 220 in the image reader and the driver 320 in the image forming section are separately turned on or off. When the image is transmitted through the external network in order to use an application program, the processing is performed as described below even if the switches SV, SW and SX (492, 493 and 494) are open. That is, in accordance with an instruction 482 (control signal A) from the network interface controller 405, an instruction 483 for short circuit (control signal B) is entered to the power supply controller 491 from the general controller 402 as needed. Then, the switch SV (492) is consequently closed, so that the application is processed by the application operator 441. If the image is printed successively, the switch SX (494) is also instructed to close.

Figure 7:
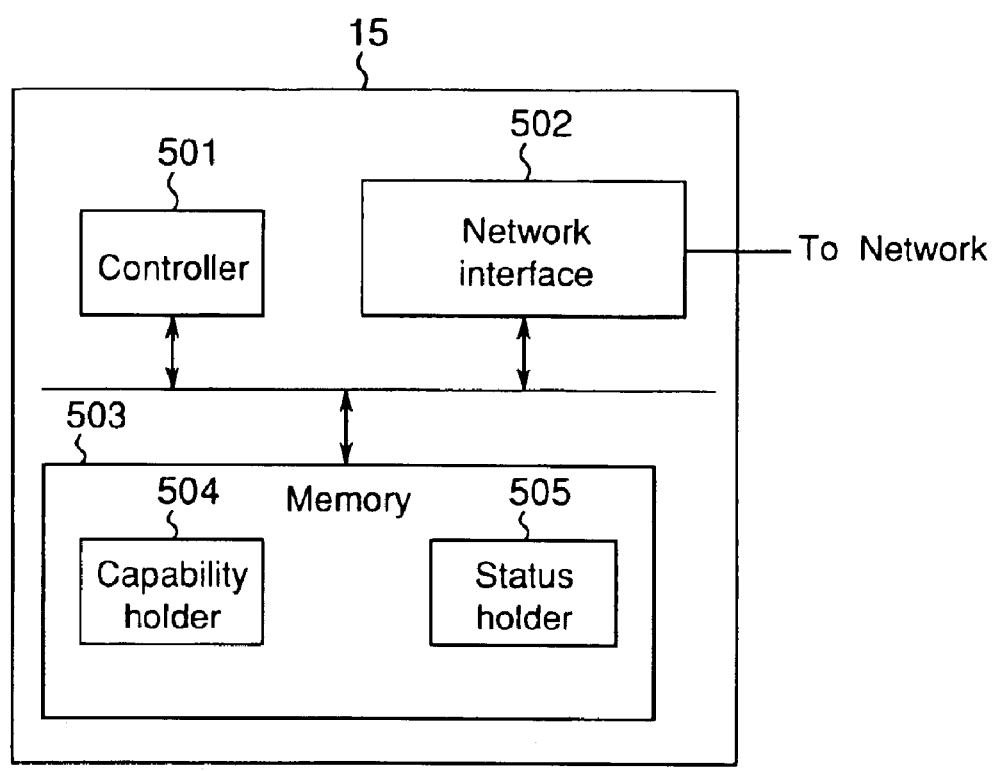
FIG. 7 is a block diagram of a server.

Next, the server 15 will be described for controlling various apparatuses such as the copying machine and the printer through the network 17. FIG. 7 shows a structure of the server 15, which comprises a controller 501, a memory 503 and a network interface 502. The memory 503 further comprises an apparatus capcapability holder 504 and a status holder 505.

The controller 501 of the server 15 communicates with the apparatuses in the network to send and receive necessary data and to control the status of the network, as needed. The network interface 502 functions as an interface between the server 15 and the network 17. The capcapability holder 504 is a memory for adding or deleting apparatus capability when the apparatus is added to or deleted from the network 17. Automatically or with the help of the display device, the controller in a certain apparatus in the network sends the data for adding or deleting the apparatus capability through the network. At this time, the controller 501 communicates with the apparatus, whereby the data is captured by the capcapability holder 504 and the contents in the capcapability holder 504 are updated. The status holder 505 is a part for holding status data of the apparatuses connected to the network, which is read every certain time by the controller 501. When a certain output apparatus is paper empty or in trouble, the status holder 505 functions as a database for preventing the selection thereof for the image output.

Next, operation when an application program is used will be described. It is assumed here that the application program is used in a network system, where one apparatus B (digital copying machine) has the application program, but not so the other apparatus A (digital copying machine). As described previously, the application program is stored in the auxiliary memory 415. In order to output the image edited by using the application program in the apparatus B, the sequence varies depending on whether the image data is received from the apparatus B or A. When the image data is received from the apparatus B and also sent to the apparatus B, the apparatus is used as a normal stand-alone apparatus. On the other hand, when the image data is received from an apparatus (e.g., the apparatus A) other than the apparatus B, the application program is used by taking into account the status of the apparatus having the application program. For example, when the apparatus B performs the copying operation which does not use the application program, the apparatus A can use the application program of the apparatus B.

To sum up, there are three types of sequences when the application program is used, as described below.

1: An apparatus having the application program edits the image by the use of the application program not through the network 17. Then, the apparatus itself outputs the image.

2: An apparatus having the application program edits the image by using the application program not through the network 17. Then, another apparatus outputs the image through the network 17.

3: The image is edited by using the application program in another apparatus in the network.

The sequences in these types include the control by the apparatus allowed to use the application program and the control by the another apparatus allowing the former to use the application program. The sequences will be explained below.

(1) The apparatus uses its own application program and the apparatus itself sends the image.

In this type, the apparatus having the application program edits the image by using the application program not through the network 17 and the apparatus itself sends the image. That is, the edition and output of image data are performed as a normal stand-alone apparatus. Since this control is not novel, the detailed description is omitted. However, it is noted here that because the copying machine has the image switcher 471, the image switcher 471 is controlled differently from a normal stand-alone copying machine.

The control of the image switcher 471 will be described. The general controller 402 recognizes information received from the panel 421 and the button 422. When the information is decided to indicate that the apparatus edits the image by using its own application program and the apparatus itself sends the image data, the general controller 402 instructs to connect line LD to line LF in the image switcher 471.

(2) The apparatus uses its own application program and the another apparatus outputs the image.

There are two differences between the output from the other apparatus in this type and the output from the apparatus itself having the application program in the above type. A first difference is that the communication with the apparatus to which the image is to be sent takes place in order to make the apparatus prepare beforehand for the image input. A second difference is control in the image switcher 471. The transmission itself of the image in the network system is known, and the two differences will be briefly described because.

First, the request for the preparation for the image input will be described. The information received from the panel 421 and the button 422 is recognized by the general controller 402. When the information is decided to indicate that the apparatus edits the image by using its own application program and the another apparatus outputs the image, the general controller 402 sends a command with the network interface controller 405. The network interface controller 405 sends necessary information to the server 15 and receives the status of the apparatus to receive the image data. The interface controller 405 informs the general controller 402 of the result. When the interface controller 405 receives preparation end status, preparation for the image transmission from the apparatus itself is started.

Next, the control of the image switcher 471 (in the apparatus which sends image data to the network) will be described. The general controller 402 recognizes information received from the panel 421 and the button 422. When the information is decided to indicate that the apparatus edits the image by using its own application program and the another apparatus outputs the image, the general controller 402 instructs to connect line LA in the image switcher 471.

Next, the control of the image switcher 471 (in the apparatus which receives the image from the network) will be described. The general controller 402 recognizes information received from the panel 421 and the button 422. When the information is decided to indicate that the apparatus edits the image by using its own application program and the another apparatus outputs the image, the general controller 402 instructs to connect line LJ in the image switcher 471.

(3) The application program in the another apparatus B is used. (That is, as to the apparatus B, the application program in the apparatus B itself is used by the apparatus A)

Figure 8:
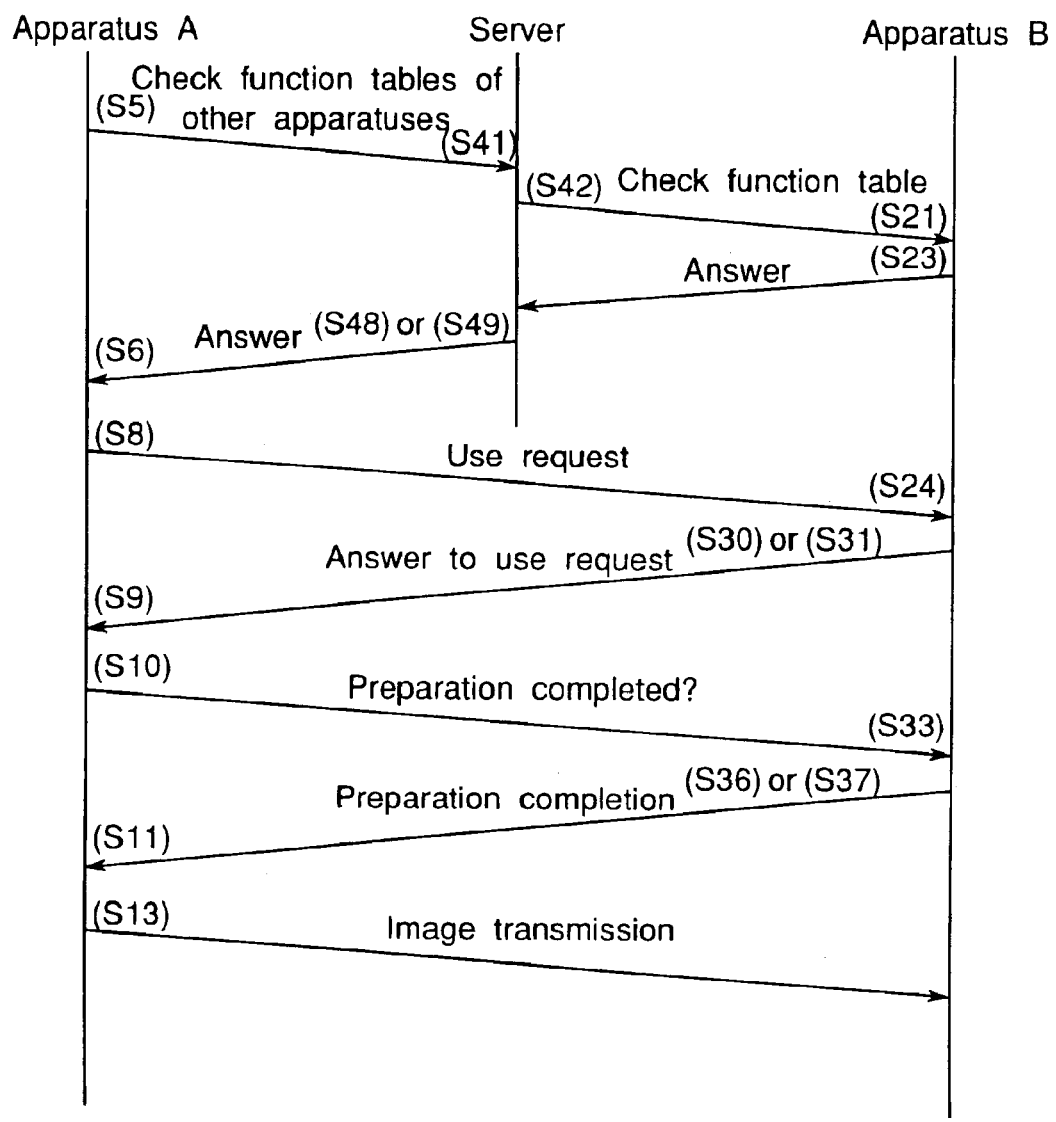
FIG. 8 is a general sequence diagram of the use of an application program of another apparatus through the network.
Figure 9:
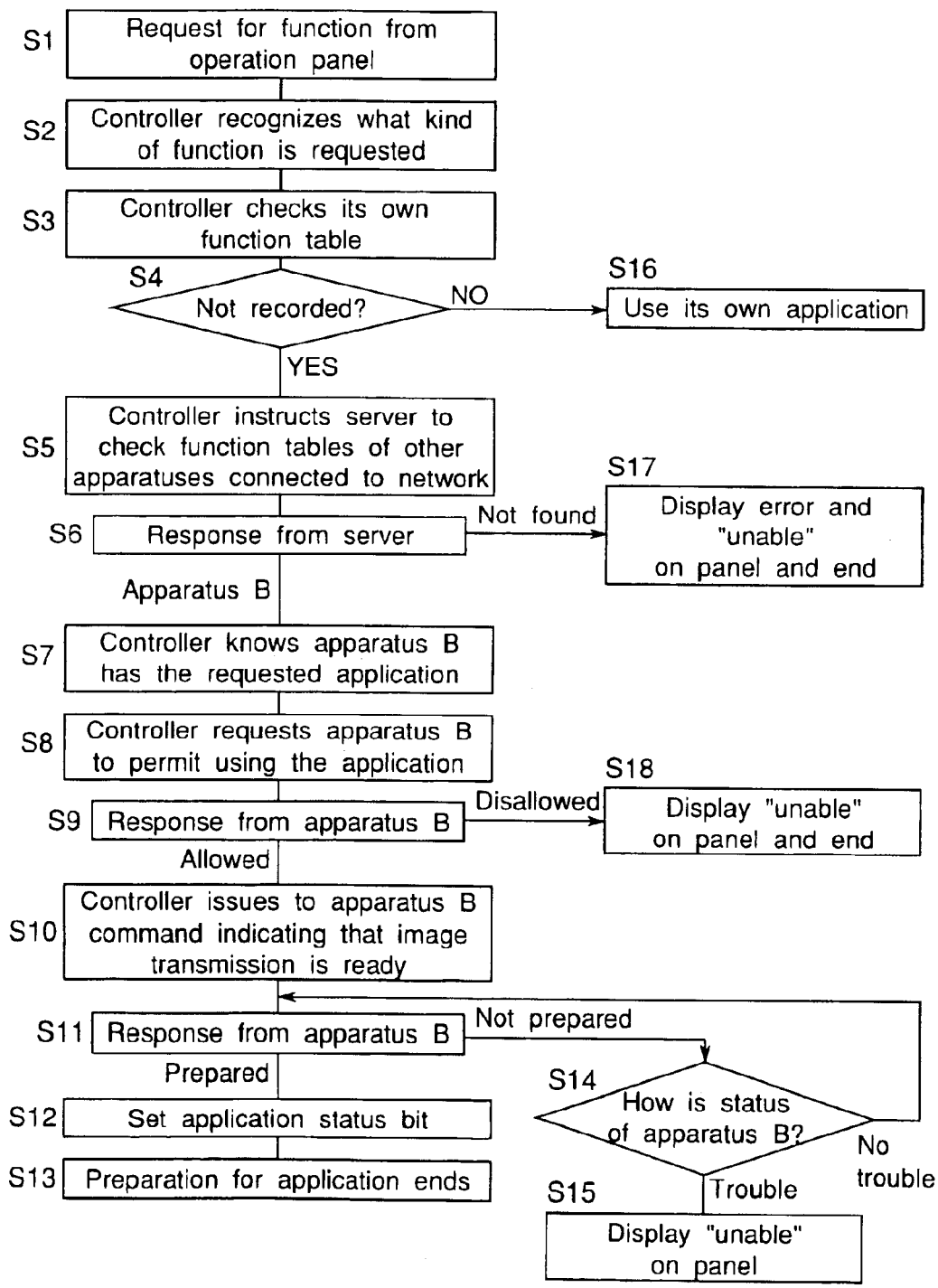
FIG. 9 is a sequence diagram of an apparatus requesting the use of the application program when the use of the application program in another apparatus is requested.
Figure 10:
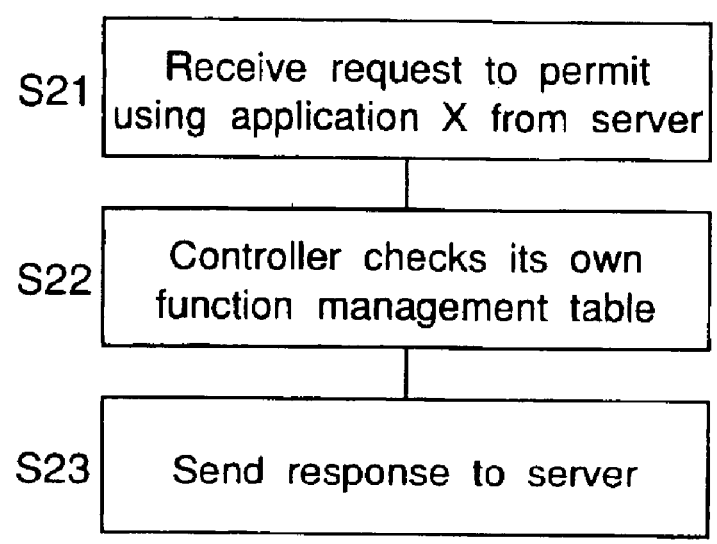
FIG. 10 is a first sequence diagram of the another apparatus when a request to use the application program for the use of the application program in the another apparatus.
Figure 11:
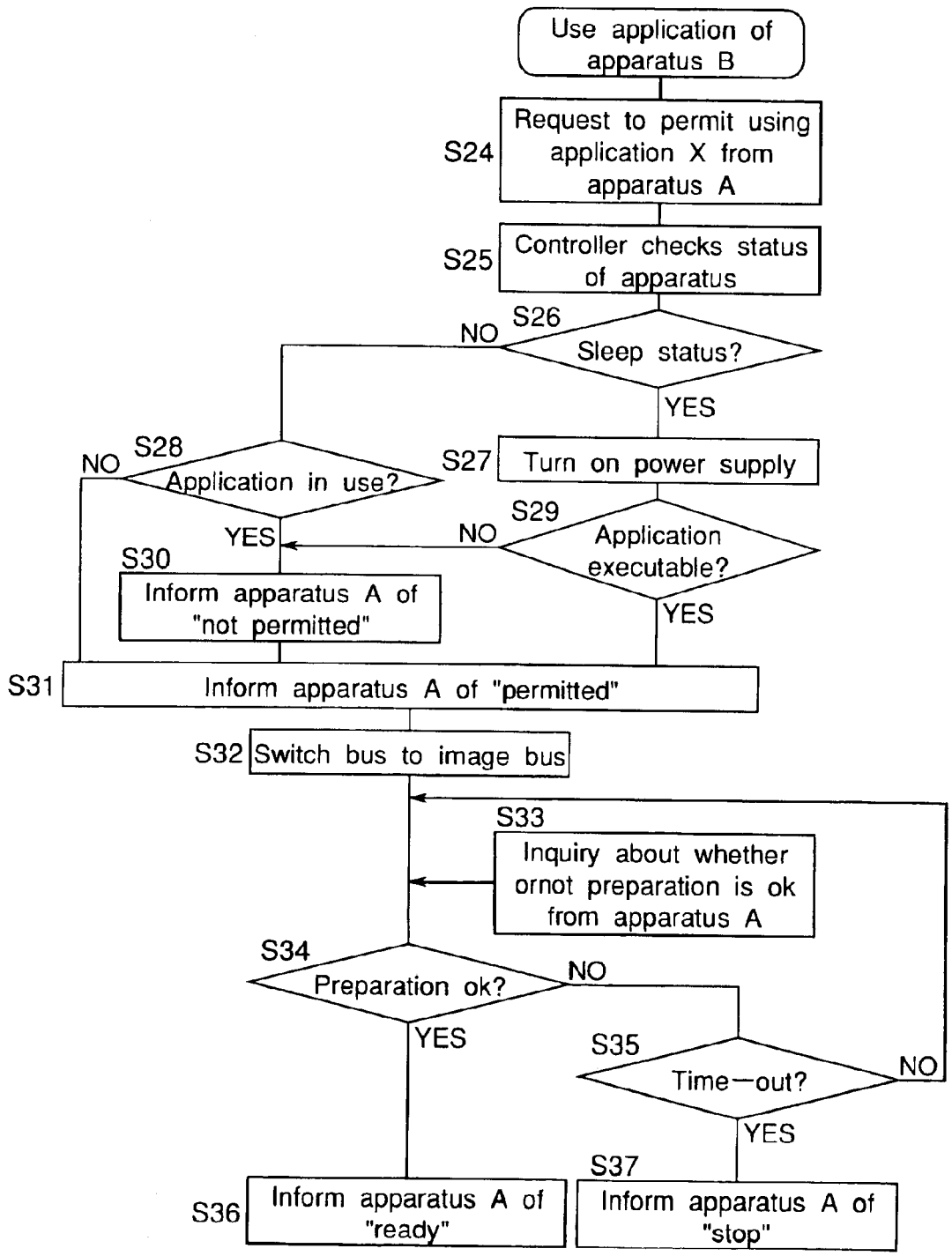
FIG. 11 is a second sequence diagram of the another apparatus when a request to use the application program for the use of the application program in the another apparatus.
Figure 12:
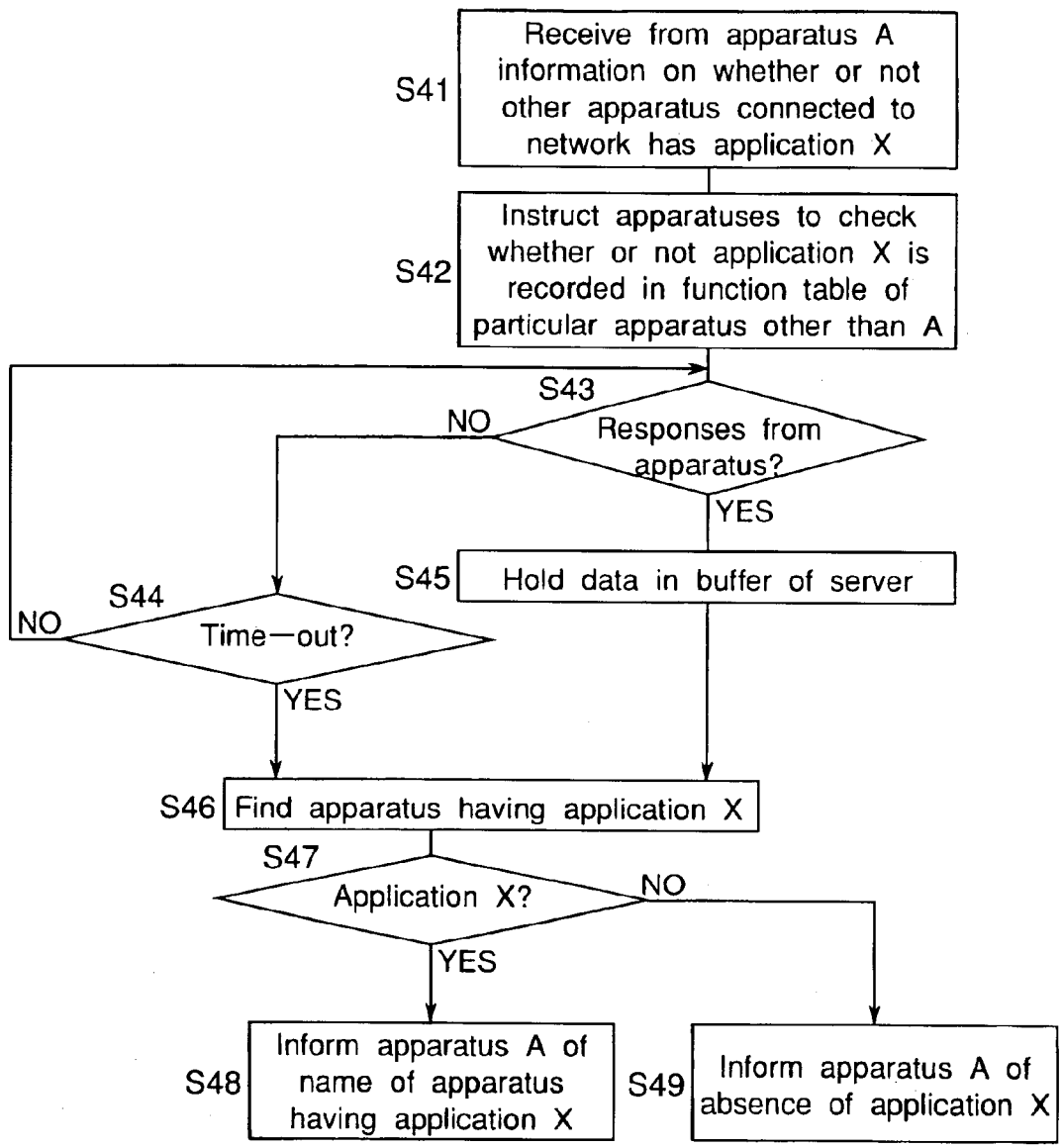
FIG. 12 is a sequence diagram of a server when a request to use the application program for the use of the application program in the another apparatus.

A sequence will be described below in which the apparatus A edits the image by using the application program in the apparatus B. Necessary information is sent and received among the apparatus A, the apparatus B and the server 15. Finally, the apparatus A transmits the image to the apparatus B, and then the image is processed by the application program of the apparatus B. The apparatus A is allowed to use the application program, while the other apparatus B allows the apparatus A to use the application program in the apparatus B. FIG. 8 shows a general sequence among the apparatus A, the server 15 and the apparatus B. FIG. 9 shows a sequence of the apparatus A (which uses the application program of the other apparatus), FIGS. 10 and 11 show sequences of the apparatus B (which is requested to allow the use of its own application program depending on its various statuses), and FIG. 12 shows a sequence of the server 15.

First, the above-mentioned operation (1) in the apparatus A will be described with reference to FIG. 9. When an instruction for the operation is received from an operation panel of the apparatus A (step S1), the controller 401 decides what function or operation is requested (step S2). For a specified image processing, it is performed by an application program X. It will be described which apparatus can execute the application program X. First, it is checked whether or not the apparatus can execute the application program X by itself (step S3). The controller checks the contents in the function management table 414 because the apparatus's own application program is registered in the function management table 414 in the memory 411. When the application program X is registered, the application program X in the apparatus A is evoked to process the image (step S16). On the other hand, when the application program X is not registered, the controller connects the network interface 481 through the command bus. Then, it sends to the server 15 the data for instructing the server 15 to check whether or not the application program X is registered in the function management tables in the other apparatuses (step S5; refer also to FIG. 8).

The operation (1) in the server 15 will be described with reference to FIG. 12. The server 15 receives the above-mentioned instruction sent at step S5 in FIG. 9 (step S41) and instructs the controller(s) of a specified apparatus or all the apparatuses in the network to check whether or not application program X requested by the apparatus A is registered in the function management table(s) in the apparatus (es) (step S42).

The operation (1) in the apparatus B will be described with reference to FIG. 10. The server 15 receives the above-mentioned instruction from the apparatus B (step S21 in FIG. 10). The controller 401 reads the contents in its function management table 414 (step S22) The apparatus B responds to the server 15 by sending the result of the check on whether or not the requested application program X is registered (step S23). That is, the apparatus B sends the data that the application program X is "registered".

Next, the above-mentioned operation (2) in the server 15 will be described with reference to FIG. 12. When the server 15 receives the above-described answer from the apparatuses (YES in step S43; refer also to FIG. 8), the data is temporarily held in a buffer in the server 15 (step S45). The server 15 waits for the answer until a certain time elapses (step S44). Then, the server 15 checks the contents in the buffer (step S46) and decides whether or not application program X exists in the buffer (step S47). Then, the server 15 returns to the apparatus A an answer that application program X exists or not (steps S48 and S49).

Next, the operation (2) in the apparatus A will be described with reference to FIG. 9. The apparatus A captures the answer sent to the apparatus A from the server 15 through the network interface 481 (step S6; refer also to FIG. 8). The answer is temporarily stored in the auxiliary memory 415. A message of "unable" is displayed in the panel 421 and the operation is completed (step S17). When a data end command is sent from the server 15, the controller 401 reads the data stored in the auxiliary memory 415 and checks the contents of the data. In this manner, the apparatus A knows that the apparatus B has the requested application program X (step S7).

Then, the controller 401 creates a data to request the apparatus B for permitting the use of application program X and sends it to the apparatus B (step S8).

Next, the operation (2) in the apparatus B will be described with reference to FIG. 11. The network interface 481 in the apparatus B receives from the apparatus A information on the request for the use of application program X (step S24). The controller 401 in the apparatus B is informed of the receipt of the information and checks whether or not application program X can be used by the apparatus A (step S25). If the controller is in the sleep status (step S26), the network interface 481 issues a command to activate the controller. When the controller is activated, the network interface 481 issues a command to turn on the power supply of the auxiliary memory 415 (step S27). Thus, the power supply of the auxiliary memory 415 is turned on. Then, it sends an answer back to the network interface controller 405 that the preparation of transmission is completed. The network interface controller 405 confirms the answer of the completion of the preparation and informs it to the apparatus A. The controller 405 opens the bus to the external network. After all the data from the apparatus A are captured in the auxiliary memory 415, the controller reads the contents of the data and knows that the request is the use of application program X.

Then, the controller 401 asks the application controller 404 whether or not application program X is in use (step S28) and whether or not application program X is executable (step S29). When the application controller 404 leaves the sleep status and answers that application program X is executable, the controller 401 issues a command to "permit transmission" to the apparatus A (step S31). Moreover, when the apparatus B is active without using application program X, the controller issues a command to "permit transmission" to the apparatus A (step S31). Otherwise, the controller issues a command indicating "transmission not permitted" to the apparatus A (step S30).

In the case of the permission, the controller 401 switches the bus to the external network from the command bus to the image bus. Furthermore, the switches in the image switcher 471 are connected to the network interface 481 and the application operator 441 (step S32). This is connection through line LH in FIG. 5. In this way, the apparatus B waits for a signal from the apparatus A indicating that the preparation is OK (step S33). When the apparatus B receives the signal, it reconfirms that the preparation is OK (step S34). Then, the apparatus B informs the apparatus A of the completion of the preparation (step S36). If the preparation for the operation cannot be completed within the time (step S35), the apparatus B sends an answer of "stop" to the apparatus A (step S37).

Next, the above-mentioned operation (3) in the apparatus A will be described with reference to FIG. 9. When the network interface 481 in the apparatus A receives the above-described answer from the apparatus B, the controller is informed of the receipt of the answer (step S9). When the answer of "permit transmission" is received from the apparatus B, the controller waits for the preparation end command from the apparatus B (step S10). When the controller receives the preparation end command (step S11), it sets an application status bit (step S12). Then, it switches the bus to the external network from the command bus to the image bus. Additionally, the switches in the image switcher 471 are connected to the image reader 200 and the network interface 481 (line LA in FIG. 5). The preparation is thus completed (step S13), and the transmission of the image to the apparatus B is started.

On the other hand, when the controller receives the answer of "transmission unable" from the apparatus B, it checks the status of the apparatus B (step S14). When the status has no problem, it again requests the apparatus B to prepare for image transmission. When the status of the apparatus B has a problem, the general controller 402 instructs the operation controller 403 to display a message of "unable" in the panel 421 (step S15).

Next, will be described how a destination apparatus for outputting the data processed by the application program is specified. When the apparatus A uses the application program in the apparatus B, the apparatus A, the apparatus B or another one is selected as an apparatus for outputting the processed data. The sequence of the selection will be described with reference to FIGS. 13 and 14.

Figure 13:
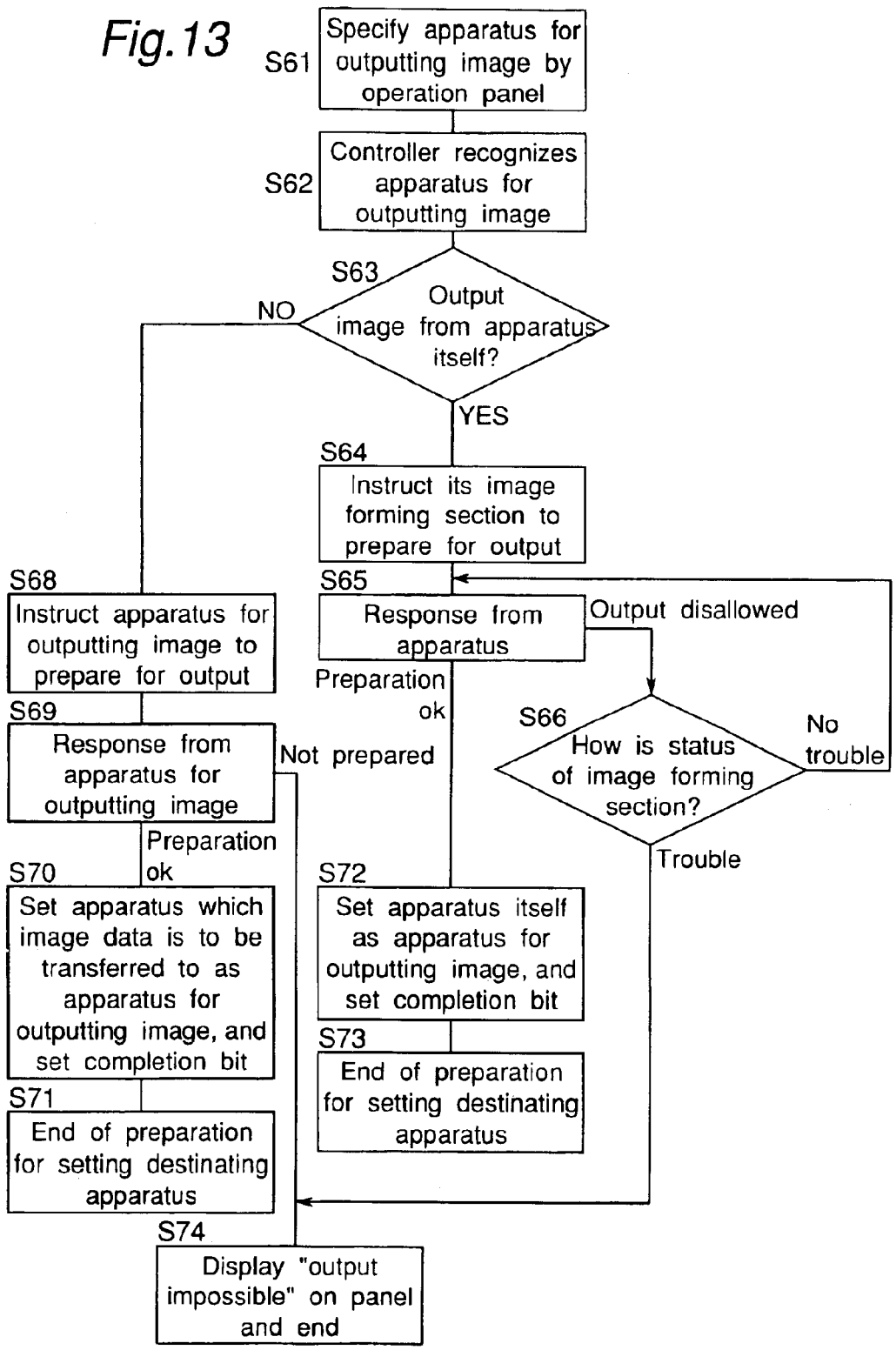
FIG. 13 is a sequence diagram of the specification and preparation of the apparatus for outputting data, by the apparatus requesting the use of the application program in the another apparatus.

As shown in FIG. 13, when a destination apparatus for outputting the data is specified by the use of the panel 421 and the button 422 of the apparatus A (step S61), the general controller 402 recognizes the destination apparatus (step S62). If the destination apparatus for outputting the data is the apparatus A itself (YES at step S63), the apparatus A instructs its own image forming controller 407 to prepare for the data output (step S64). Then, the apparatus A waits for an answer indicating that the data can be outputted or not. When the preparation end command is received by the controller (step S65), the controller sets the apparatus A itself as the destination apparatus for outputting the data and sets an end bit (step S72). Then, the bus is switched to the image bus by the image switcher 471. The preparation is thus completed, and the output of the image by the printer 300 is started (step S73).

On the other hand, when an answer of "not to permit transmission" is received from the image forming section 300, the controller checks the status of the image forming section 300 (step S66). When the image forming section has no problem, the controller again requests it to prepare for the image output. When the status of the image forming section has a trouble, the general controller 402 instructs the operation controller 403 to display "output impossible" in the panel 421 (step S74).

Figure 14:
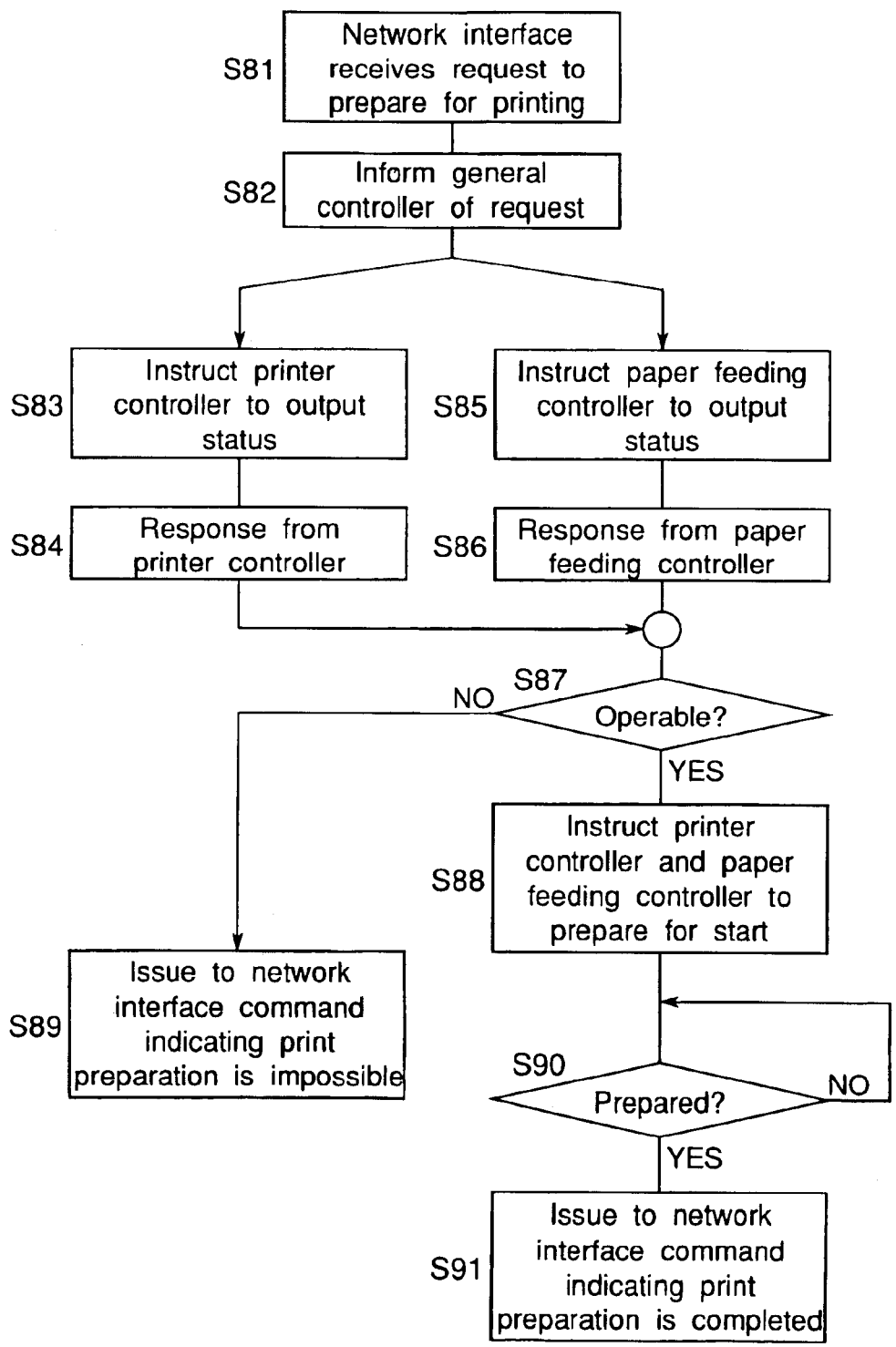
FIG. 14 is a sequence diagram on the preparation for printing in the apparatus receiving the request to use the application program for the another apparatus.

On the other hand, for a request to output the data from an apparatus other than the apparatus A, the network interface controller 405 is informed of the request, and the controller requests the destination apparatus (e.g., the apparatus B) in the network to permit data transmission (step S68). FIG. 14 shows the sequence of the output in the apparatus B. The same sequence is applied to an apparatus other than the apparatus B which does not have application program X.

Next, the sequence of the preparation for the printing in the apparatus B will be described with reference to FIG. 14. When the network interface 481 receives a request to prepare for the printing (step S81), it informs the general controller 402 of the contents of the request (step S82). The general controller 402 asks the image forming controller 407 and the paper feeding controller 408 whether or not the data can be outputted (steps S83 and S86). The general controller 402 receives an answer to the question (steps S84 and S86). When the data cannot be outputted (step S87), a command that the preparation for the printing is impossible is sent to the network interface 481 (step S89). When the apparatus A receives the information, the general controller 402 displays a message of "output impossible" in the panel 421 and terminates the sequence (step 74 in FIG. 13).

When the operation is possible, the general controller 402 instructs the image forming controller 407 and the paper feeding controller 408 to prepare the activation (step S88). When the preparation is completed (step S90), a command to allow the preparation for the printing is sent to the network interface 481 (step S91). When the apparatus A receives the command, it sets the destination apparatus for data transmission as the apparatus for outputting the data and sets the end bit (step S70 in FIG. 13). Then, the sequence of the preparation is terminated (step S71 in FIG. 13).

Figure 15:
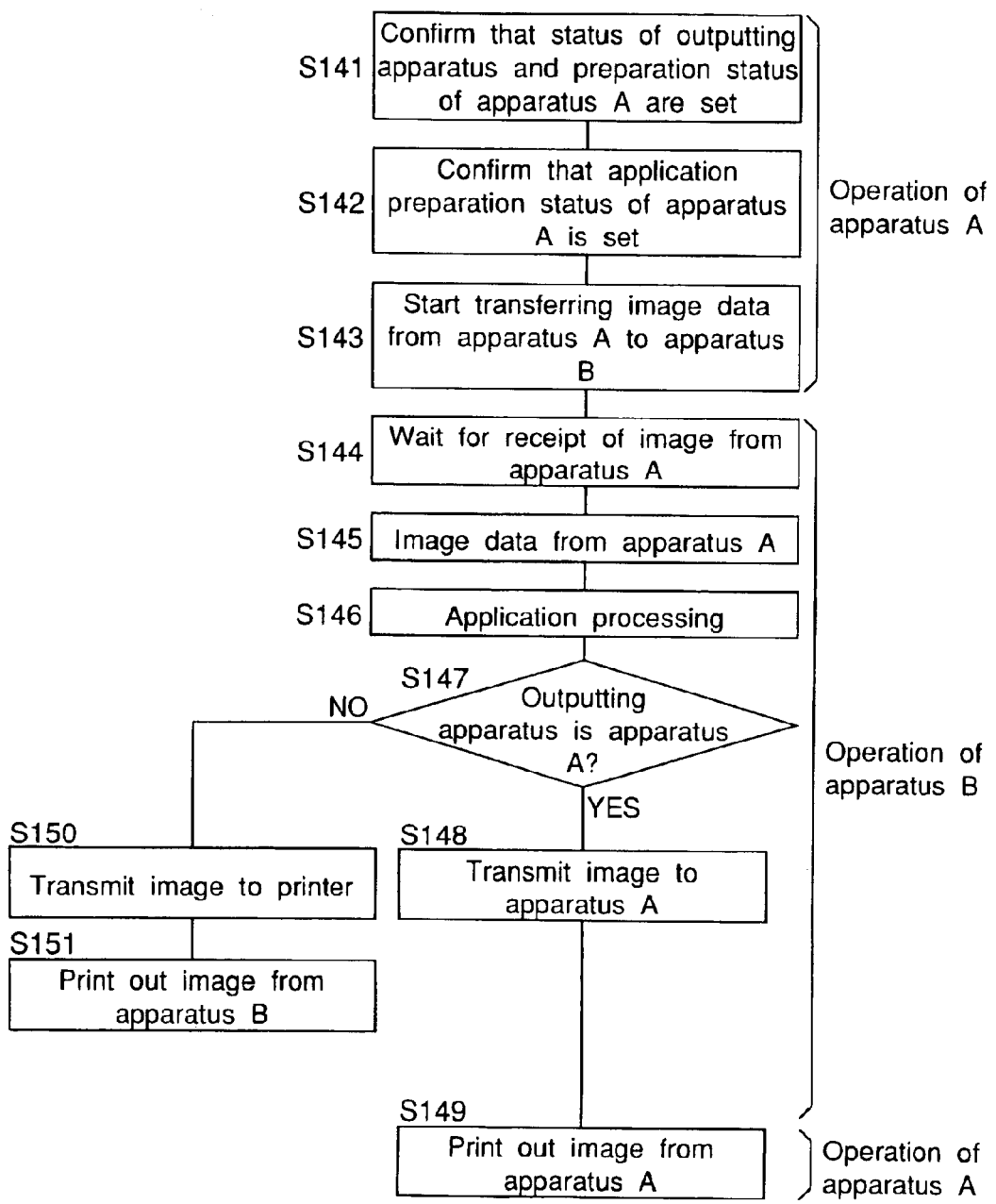
FIG. 15 is a general sequence diagram of the application processing and data output for the use of the application program of other apparatus.

Next, FIG. 15 shows a general sequence in which the data is processed by using the application program in the other apparatus (the apparatus B) and outputted from the apparatus A or B. Only the apparatuses A and B are described in FIG. 15 as an apparatus for outputting the data. However, the apparatus A is described as a representative of the apparatus other than the apparatus B, because an apparatus other than the apparatus B has, in fact, the same sequence as that in the apparatus A.

When the general controller 402 of the apparatus A confirms that the application program and the apparatus for outputting the data are ready (steps S141 and S142), it starts transmission of the image to the network through the network interface 481 (step S143). As the apparatus B is in an image wait status (step S144), when the image is received to the network interface 481 (step S145), the image is sent to the application operator 441 through line LH in the image switcher 471. In the application operator 441, the image is processed by the application program (step S146).

After the processing with the application program is completed, the image is transmitted to the apparatus for outputting the data. However, the image may be temporarily held in a memory or the like, and in this case, the image is processed by the encoder/decoder 427 and then kept in the image memory 413. The following operation is performed when the apparatus B which has executed the application processing is used as the apparatus for outputting the image (NO at step S147). That is, the image is sent to the electrical processor 461 of the image forming section through line LF in the image switcher 471 (step S150), and the image is outputted from the apparatus B (step S151). The following operation is performed when an apparatus other than the apparatus B which has executed the application processing is used as an apparatus for outputting the image (YES in step S147). That is, the image is sent to the network interface 481 in the apparatus B through line LE in the image switcher 471 and then sent to the apparatus A for outputting the image (step S148), and the apparatus A outputs an image (step S149).

Each time the general controller 402 receives the situation of image transmitted from the controllers, it changes connection in the image switcher 471.

Figure 16:
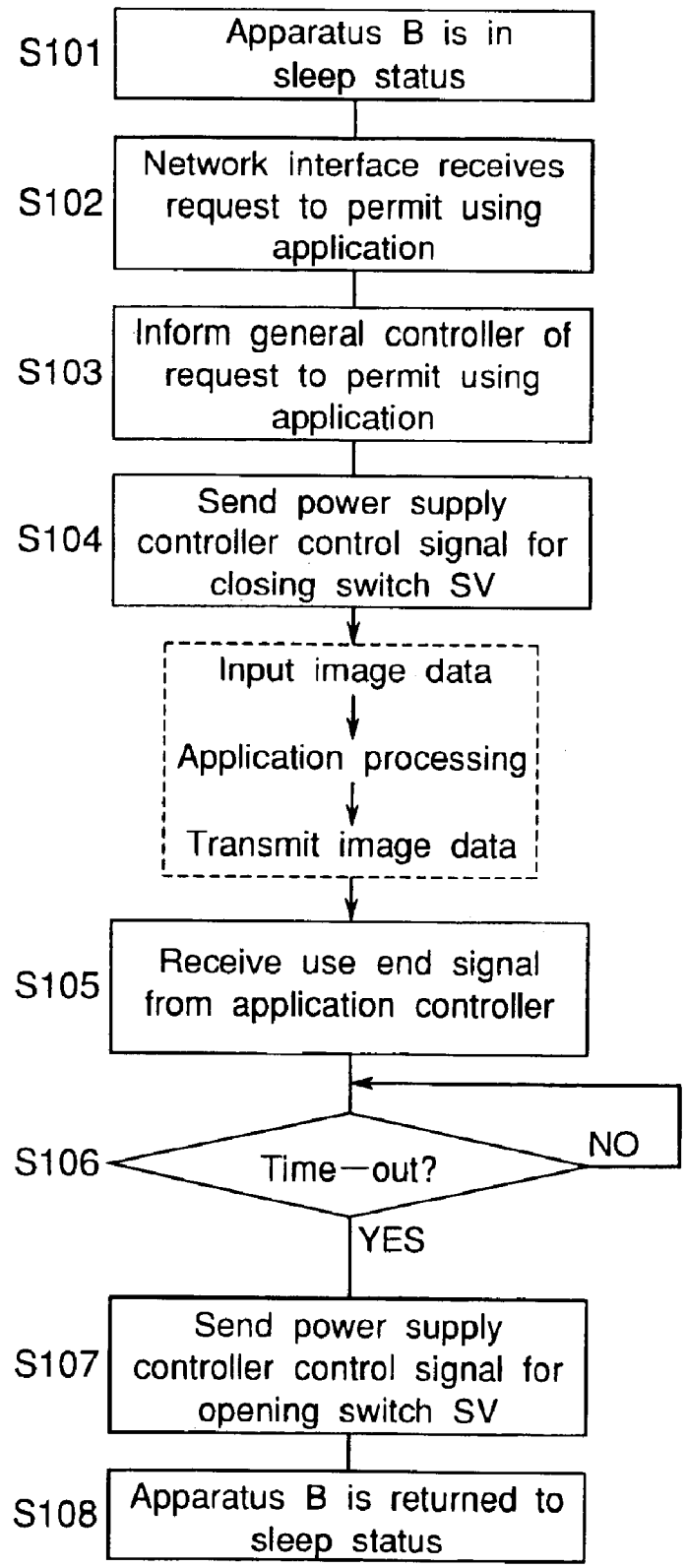
FIG. 16 is a sequence diagram of the release of other apparatus from a sleep status in the application processing alone when the application program in another apparatus is used.
Figure 17:
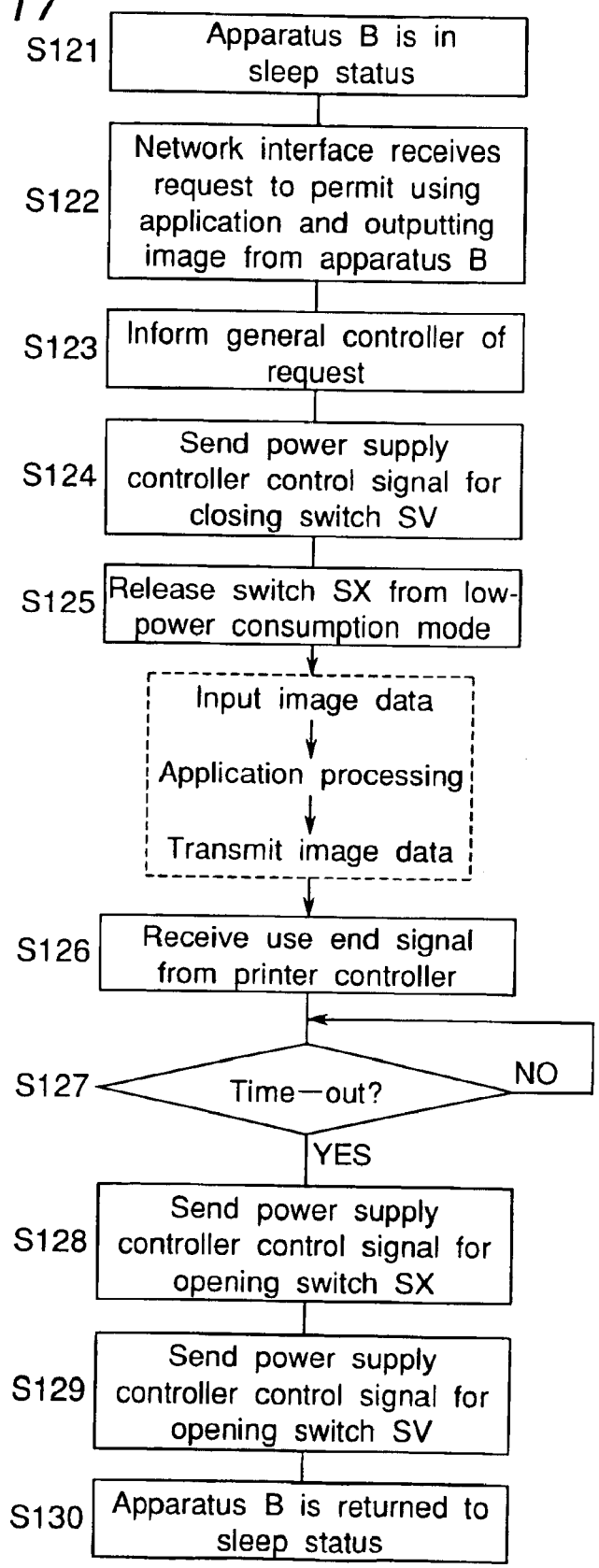
FIG. 17 is a sequence diagram of the release of other apparatus from the sleep status in outputting the data after the application processing when the application program in another apparatus is used.

Next, it will be described how the power supply controller 491 is operated when the apparatus for executing the application processing is in the sleep status. As described above, when the apparatus B is in the sleep status, the electrical power is not supplied to the elements other than the general controller 402 and the network interface controller 405. When a request for the application processing is sent from the apparatus A (step S24 in FIG. 11), the power supply controller 491 starts the power supply (step S27 in FIG. 11). The details will be described with reference to FIGS. 16 and 17. FIG. 16 shows a sequence of the operation when an apparatus other than the apparatus B is used as the apparatus for outputting the image. FIG. 17 shows a sequence of the operation when the apparatus B is used as the apparatus for outputting the image.

When the apparatus B is in the sleep status (step S101, S121), a request to use the application is sent to the network interface controller 405 (step S102, S122). At this time, the network interface controller 405 informs the general controller 402 of the request (step S103, S123). The switch SV (492) is closed in answer to the request (step S104) if an apparatus other than the apparatus B is used as an apparatus for outputting the image. On the other hand, the switches SV (492) and SX (494) are closed in answer to the request (steps S124 and S125) if the apparatus B is used as an apparatus for outputting the image. In this manner, the image data is inputted and processed by the application program, and then the obtained image data is transmitted.

When an apparatus other than the apparatus B is used as an apparatus for outputting the image, the operation is performed in the following manner. After the application processing terminates, the information on the termination is inputted to the general controller 402 from the application controller 404 (step S105). A timer in the general controller 402 is then started. When the timer counts up a predetermined time, it decides the time-out (step S106), and an instruction to open the switch SV (492) is sent to the power supply controller 491 (step S107). In this way, the apparatus B is returned to the sleep status (step S108).

When the apparatus B is used as the destination apparatus for outputting the image, the operation is performed in the following manner. After the apparatus B terminates the image output, the information on the termination is inputted to the general controller 402 from the image forming controller 407 and the paper feeding controller 408 (step S126). The timer in the general controller 402 is then started. When the timer counts the predetermined time up, it decides that the time-out occurs (step S127). Then, an instruction to open the switches SV and SX (492 and 494) is sent to the power supply controller 491 (steps S128 and S129). In this way, the apparatus B is returned to the sleep status (step S130).

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor comprising:
    a plurality of function blocks connectable to each other and dealing with image data;
    an interface connected to a network; and a bus changer which changes bus connections among said plurality of function blocks and said interface.

2. The image processor according to claim 1, wherein said plurality of function blocks comprise an image input block which receives image data, an image processing block which deals with image data, and an image output block which outputs the image data.

3. The image processor according to claim 2, wherein said image input block receives image data read with an image sensor.

4. The image processor according to claim 2, wherein said image output block prints an image on a registering medium.

5. The image processor according to claim 2, wherein said bus changer which is connected to the image input block changes the bus connection such that image data from said network is received through said interface and sent to said network through said image output block or said interface.

6. The image processor according to claim 1, wherein one of said function blocks comprises a memory which stores an application program, and a controller which processes the image data according to the application program.

7. The image processor according to claim 6, wherein said memory has a capacity which stores another application program further.

8. The image processor according to claim 6 wherein said memory comprises a management table which manages the application programs stored therein.

9. An image processor comprising:
    a plurality of function blocks connectable to each other and dealing with image data;
    an interface connected to a network;
    a bus changer which changes bus connections among said plurality of function blocks and said interface; and
    a controller which discriminates data received from said network and controls data transmission to one of the function blocks to be operated.

10. The image processor according to claim 9, further comprising a power supply controller which supplies electric power to function blocks to be operated in said plurality of function blocks.

11. The image processor according to claim 10, wherein said power supply controller stops power supply to said function blocks after processing in said function blocks is completed.

12. The image processor according to claim 9, wherein said plurality of function blocks comprise an image input block which receives image data, an image processing block which deals with image data, and an image output block which outputs the image data.

13. An image processor comprising:
    a plurality of function blocks connectable to each other and dealing with image data;
    an interface connected to a network;
    a bus changer which changes bus connections among said plurality of function blocks and said interface;
    a memory having a function management table to manage executable functions; and
    a controller which requests an external apparatus connected through said interface and said network to operate a function when the function is not managed in the function management table in said memory.

14. The image processor according to claim 13, wherein one of said function blocks comprises a memory which stores an application program, and a controller which processes the image data according to the application program.

15. The image processor according to claim 14, wherein said memory has a capacity which stores another application program further.

16. A method of controlling image processing in an image processor including a plurality of function blocks, comprising following steps of:
    receiving a request to perform a function;
    deciding whether the function is executable in said image processor; and
    changing bus connection between a necessary function block and said interface to operate an external apparatus connected through an interface connectable to said network when the function is decided not executable in said image processor.

17. The method according to claim 16, wherein the decision is performed with reference to a management table provided to manage executable functions stored in a memory.

18. The method according to claim 16, further comprising the step of sending a signal to request execution of the function to the external image processor.

19. An image forming apparatus comprising:
    a plurality of processing units including at least an image input unit which receives image data and an image output unit which outputs image data;
    a network interface connecting said plurality of processing units to a network; and
    a changer which changes a first state, wherein a processing unit in said plurality of processing units is connected to another processing unit therein, to a second state, wherein one of said plurality of processing units is connected via said network interface to the network and vice versa.

* * * * *